O. EBERT.
TIRE INFLATING APPARATUS.
APPLICATION FILED SEPT. 23, 1912.
1,083,440.
Patented Jan. 6, 1914.
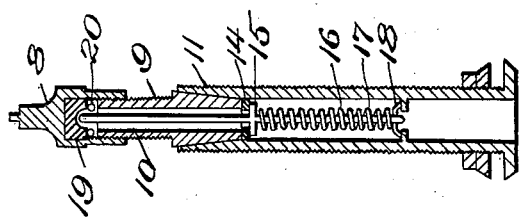
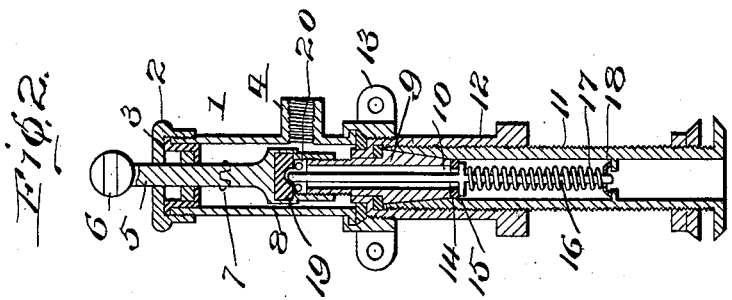
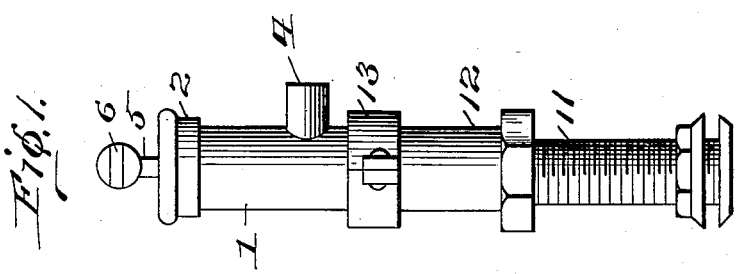
Witnesses
J. M. Fowler Jr.
M. E. Moore
Inventor
Otto Ebert
By
Attorney
COLUMBIA PLANOGRAPH CO., WASHINGTON, D. C.

UNITED STATES PATENT OFFICE.

OTTO EBERT, OF IRONTON, OHIO.

TIRE-INFLATING APPARATUS.

1,083,440.  Specification of Letters Patent.  Patented Jan. 6, 1914.

Application filed September 23, 1912. Serial No. 721,832.

*To all whom it may concern:*

Be it known that I, OTTO EBERT, a citizen of the United States, residing at Ironton, in the county of Lawrence and State of Ohio, have invented certain new and useful Improvements in Tire-Inflating Apparatus, of which the following is a specification.

My invention relates to improvements in tire inflating apparatus, and has for its leading object the provision of means for inflating the tire and retaining the air without affording an opportunity for it to escape while the cap is being screwed on.

Another object of the invention is to provide an attachment for inflating the tire without permitting an escape of the air which will be of the simplest, cheapest, and most durable construction to provide a desirable and practical article of this class.

A further object of the invention is to provide an attachment of this nature which will be applicable to pneumatic tires of any size and make; which attachment can be readily engaged and disengaged on the valve stem of the tire; which can be easily and readily transported from place to place and will occupy a minimum amount of space; and which will efficiently and reliably prevent the escape of the air from the tire during the inflating operation.

To attain the desired objects, the invention broadly stated consists of the combination with the valve stem of a pneumatic tire, of a member carrying a valve seated on said stem, and means for raising and lowering said member to seat and unseat the valve to permit the inflating of the tire.

The invention further consists in certain novel features of construction and arrangements of parts, substantially as disclosed herein.

In order that the detailed construction of my attachment may be readily seen and its many advantages be fully appreciated, I have illustrated in the accompanying drawing an inflating attachment constructed in accordance with and embodying the principles of my invention, it being understood that I do not limit myself to the precise details of construction, but reserve the right to resort to such changes and modifications as fall within the spirit and scope of the invention, as defined in the appended claim.

Figure 1 is a side elevation of the attachment in position upon the valve stem of a pneumatic tire. Fig. 2 is a vertical central sectional view thereof, and Fig. 3 is a sectional view of the apparatus with the connecting sleeve removed to illustrate details of construction.

In the drawings:—The numeral 1 designates a sleeve, onto which is threaded a closure cap 2, preferably made air-tight by means of suitable packing 3. The sleeve is formed with a nipple 4, threaded to receive the connection from a pump or other suitable inflating means. Passing through cap 2 and rotatable in sleeve 1 is a key 5, formed with a head 6, and having a connection 7 to prevent it from pulling out through the packing of the closure cap when rotated. Said key is connected to the valve cap 8 at one end, which cap is threaded onto the external threads of a stem 9, formed with an axial bore 10 and ground to fit snugly in the valve stem casing 11, which is threaded externally to engage the corresponding internal threads of the connecting sleeve 12, which binds tubular stem 9 in casing 11, and is connected to sleeve 1 by the union 13. Stem 9 has a valve 15 seated on valve seat 14 of the valve stem 16 of the tire, which is contained within casing 11, and is seated by a spiral spring 17 fastened to a suitable foot-piece 18. Gaskets 19 are provided where necessary to render all parts air-tight, and cap 8 has air holes 20 formed therein to allow the air from the pump to pass therethrough.

In operation, when it is desired to inflate the tire, the pump connection is made onto nipple 4, the other parts being in position, and the key 5 is turned to rotate the cap 8 to depress stem 16 and unseat the valve 15, thus permitting the air under pressure to enter the tubular bore of stem 9 through said air holes 20 and pass by valve 15 into the tire. When the tire has been inflated to the desired extent, the key 5 is rotated to its normal position and the pump connection is detached, the spring 17 urging the stem 16 upwardly until valve 15 is again seated on valve seat 14, the air pressure within the tire assisting the spring 16 to hold the valve in closed position.

From the foregoing description, taken in connection with the accompanying drawings, the construction and operation of my improvements will be readily seen and appreciated, and it will be apparent to all that the attachment may be easily applied and removed; occupies but little space; and is of the simplest and cheapest construction to commend its use to those desiring a practical and efficient article of this nature.

I claim:—

A tire inflating device comprising a tubular member having a reduced upper end, said tubular member having a conical lower end fitted within a tire valve casing, a closure rotatably engaged on the reduced end of said tubular member and provided with air-inlet openings, a sleeve carrying an inlet and surrounding said reduced end, a valve stem movable within the body of said tubular member and finding bearing at one end against said closure, a valve on said stem normally seating against the conical end of said tubular member and effectively closing the bore thereof, and a closure actuating device carried by said sleeve for rotating said closure whereby to move said stem and unseat said valve to permit the free passage of air there-past.

In testimony whereof I affix my signature in presence of two witnesses.

OTTO EBERT.

Witnesses:
A. C. ROBISON,
ELIZABETH SCHRADER.

---

Copies of this patent may be obtained for five cents each, by addressing the "Commissioner of Patents, Washington, D. C."